March 9, 1943.   J. BETHENOD ET AL   2,313,290
APPARATUS FOR TRANSFORMING OSCILLATIONS
Filed April 3, 1939
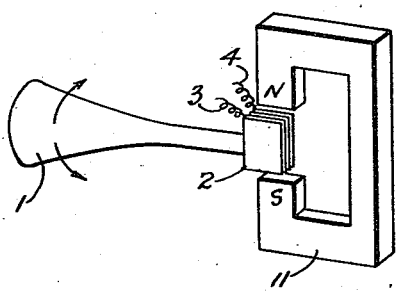
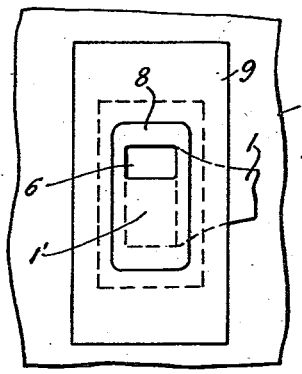
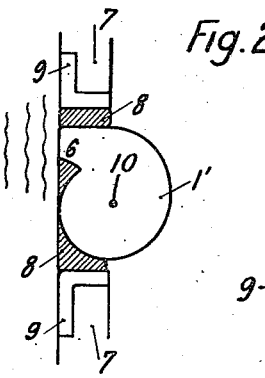
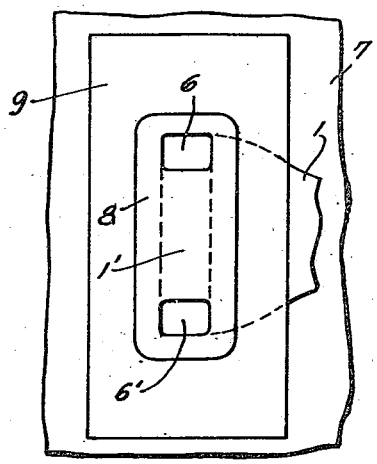
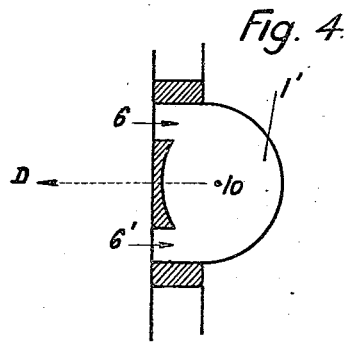

Patented Mar. 9, 1943

2,313,290

UNITED STATES PATENT OFFICE 2,313,290

APPARATUS FOR TRANSFORMING OSCILLATIONS

Joseph Bethenod and Yves Rocard, Paris, France; vested in the Alien Property Custodian Application April 3, 1939, Serial No. 265,786
In Great Britain June 2, 1938

6 Claims. (Cl. 177—386)

This invention relates to apparatus for converting electrical oscillations into mechanical oscillations or vice versa or for converting electrical oscillations of one amplitude into electrical oscillations of another amplitude, and is particularly, although not necessarily, concerned with the emission and reception of waves of supersonic (ultra-audible) frequency such as are employed for submarine exploration.

It is known that in such installations the mechanical oscillations set up require quite considerable forces but that the weak amplitudes of the movements obtained render difficult their conversion into electrical energy or vice versa and that the output of the apparatus is consequently very poor.

It is already known to use for the transmission of oscillatory mechanical energy a rod tube consisting of a material having a small damping effect (bronze, steel, quartz or the like), the section of which increases or decreases from one end to the other at a rate which varies according to the circumstances, for example in accordance with an exponential law.

In apparatus according to the present invention for converting electrical oscillations into mechanical oscillations or vice versa or electrical oscillations of one amplitude into electrical oscillations of another amplitude, especially for the reception of supersonic waves, comprising a bar, rod, tube or the like of progressively varying cross-section, preferably of exponentially varying cross-section, over at least a part of its length, this bar being excited at one end by a medium or circuit in a state of vibration, and at its other end transmitting the energy to an external medium or circuit, torsional vibrations are produced at one end of the bar or the like. Thus torsional vibrations of a solid body are used as a coupling means between a medium propagating audible or supersonic waves (or a suitable member producing alternating forces on the body in question) and a member which may be called a receiver, which is capable of transforming these vibrations into electrical signals. Alternatively similar apparatus may be used, in accordance with the invention, for transmission in which the same processes take place in the inverse sense, electric signals being transformed into torsional vibrations and then transmitted to a propagating medium (or to another member receiving these vibrations and transforming them in any manner).

Several convenient arrangements according to this invention will now be described by way of example, with reference to the accompanying drawing, in which:

Figure 1 is a diagram of one convenient arrangement,

Figure 2 is a sectional view, perpendicular to the axis, of a modified construction, Figure 3 is a face view of the construction of Figure 2, Figure 4 is a view similar to Figure 2 of a further modified construction, and Figure 5 is a face view of the construction of Figure 4.

The construction shown in Figure 1 is for converting torsional vibrations into electric signals (or inversely for producing torsional vibrations from an electric current). In this construction a bar 1 is subjected to torsional vibrations, which are indicated by curved arrows and is provided at its end 2 with a coil 5 similar to the coil of a moving-coil galvanometer, with a winding of normal type connected to two terminals 3 and 4, the winding being disposed in a magnetic field created by the magnet 11. It will be seen that the body 1 is indicated in Figure 1 as having a tapering cross-section—and according to a feature of the invention the section of the body is preferably such that it decreases along its entire length in accordance with an exponential law—with the object of producing true amplification of the torsional movement in order to increase the sensitivity of the arrangement when it operates as a receiver, or to increase the output when it operates as a transmitter.

In the construction shown in Figures 2 and 3, the end 1' of the bar 1, that is the end not carrying the coil 5, terminates in a plane surface 6 which is asymmetric with respect to the axis of the bar 1, this axis being indicated by the dot 10 in Figure 2, and is in contact with a medium propagating sound waves, this medium being water in the case of an acoustic or supersonic submarine receiver. This end 1' of the bar 1 is held in an elastic support, which preferably consists of adhesive rubber 8 with a frame 9, the arrangement serving to anchor the end 1' for example to the hull 7 of a boat.

The arrangements utilising torsional vibrations are particularly suitable for responding to or producing differential effects.

Thus in the modified construction shown in Figures 4 and 5, the end 1' is in engagement with two surfaces 6 and 6' symmetrical with respect to the axis 10 so that sound pressures reaching the surfaces 6 and 6' in phase and with the same amplitude do not produce any torsional vibration in the bar, whilst a difference in amplitude or in phase or both produces a signal. It will be seen that the system shown in Figure 4 will have, with regard to its directional properties, a diagram of radiation such that the reception will fade out when the perpendicular D to the plane 6, 6' is disposed in the direction of a sound transmitter.

What we claim is:

1. Apparatus for converting oscillations of supersonic frequency comprising an elongated member progressively varying in cross-section from one end to the other and a coil connected to one end of said elongated member, means including said coil to induce torsional oscillation of said member about its longitudinal axis, and means at the other end of said member, adapted to be positioned in contact with a medium, to transfer said oscillations to said medium.

2. Apparatus for converting oscillations of supersonic frequency comprising an elongated member progressively decreasing in cross-section from one end to the other and a coil connected to the end of said elongated member of smaller cross-section, means including said coil to induce torsional oscillation of said member about its longitudinal axis, and means at the other end of said member, adapted to be positioned in contact with a medium, to transfer said oscillations to said medium.

3. Apparatus for converting oscillations of supersonic frequency comprising an elongated member progressively decreasing in cross-section from one end to the other and for a major part of its length following an exponential law, and a coil connected to the end of said elongated member of smaller cross-section, means including said coil to induce torsional oscillation of said member about its longitudinal axis, and means at the other end of said member, adapted to be positioned in contact with a medium, to transfer said oscillations to said medium.

4. Apparatus for converting oscillations of supersonic frequency comprising an elongated member progressively decreasing in cross-section from one end to the other and for a major part of its length following an exponential law, and a coil connected to the end of said elongated member of smaller cross-section, means at said end of the elongated member of smaller cross-section, including said coil, to induce torsional oscillation of said member about its longitudinal axis, and means at the other end of said elongated member, including at least one diaphragm, the surface of which is asymmetrical with respect to the axis of torsion of said elongated member adapted to contact with a medium to transfer said oscillations to said medium.

5. Apparatus for converting oscillations comprising an elongated member progressively decreasing in cross-section from one end to the other and for at least a part of its length following an exponential law, and a coil connected to the end of said elongated member of smaller cross-section, means at said end of the elongated member of smaller cross-section, including said coil, to induce torsional oscillation of said member about its longitudinal axis, and means at the other end of said elongated member including two diaphragms symmetrical with respect to the axis of torsion of said elongated member, each disposed eccentrically with respect to said axis and adapted to be positioned in contact with a medium to transfer said oscillations to said medium.

6. Apparatus for converting oscillations of supersonic frequency comprising an elongated member progressively decreasing in cross-section from one end to the other and for a major part of its length following an exponential law, and a coil connected to the end of said elongated member of smaller cross-section, means at said end of the elongated member of smaller cross-section, including said coil, to induce torsional oscillation of said member about its longitudinal axis, means at the other end of said elongated member, including at least one diaphragm, the surface of which is asymmetrical with respect to the axis of torsion of said elongated member adapted to contact with a medium to transfer said oscillations to said medium, and flexible material supporting said diaphragm.

JOSEPH BETHENOD.
YVES ROCARD.